US011007886B2

(12) United States Patent
Alghamdi et al.

(10) Patent No.: US 11,007,886 B2
(45) Date of Patent: May 18, 2021

(54) TRAFFIC CONTROL SYSTEM USING WIRELESS POWER CHARGING

(71) Applicant: King Abdulaziz University, Jeddah (SA)

(72) Inventors: Etab Alghamdi, Jeddah (SA); Hussain Bassi, Jeddah (SA)

(73) Assignee: King Abdulaziz University, Jeddah (SA)

(*) Notice: Subject to any disclaimer, the term of this patent is extended or adjusted under 35 U.S.C. 154(b) by 374 days.

(21) Appl. No.: 16/194,850

(22) Filed: Nov. 19, 2018

(65) Prior Publication Data

US 2020/0156479 A1    May 21, 2020

(51) Int. Cl.
| | |
|---|---|
| *G08G 1/07* | (2006.01) |
| *B60L 53/12* | (2019.01) |
| *G08G 1/01* | (2006.01) |
| *H02J 50/00* | (2016.01) |
| *H02J 50/30* | (2016.01) |
| *H02J 50/20* | (2016.01) |

(52) U.S. Cl.
CPC ............ *B60L 53/12* (2019.02); *G08G 1/0116* (2013.01); *H02J 50/001* (2020.01); *H02J 50/20* (2016.02); *H02J 50/30* (2016.02)

(58) Field of Classification Search
CPC combination set(s) only.
See application file for complete search history.

(56) References Cited

U.S. PATENT DOCUMENTS

| | | | | |
|---|---|---|---|---|
| 6,064,123 | A | 5/2000 | Gislason | |
| 7,830,071 | B2 * | 11/2010 | Abramovich | ........... E01B 26/00 |
| | | | | 310/339 |
| 8,030,888 | B2 * | 10/2011 | Pandya | ............... B60L 11/1809 |
| | | | | 320/109 |
| 10,005,367 | B2 * | 6/2018 | Lee | ......................... B60L 53/60 |
| 2014/0079534 | A1 | 3/2014 | Murphy | |

(Continued)

FOREIGN PATENT DOCUMENTS

WO    2012/038955 A1    3/2012

OTHER PUBLICATIONS

Fast Paced Magnet Electric Generator ; Design for Life Industrial Design Blog ; Sep. 1, 2011 ; 3 pages.

(Continued)

*Primary Examiner* — Thomas S McCormack
(74) *Attorney, Agent, or Firm* — Oblon, McClelland, Maier & Neustadt, L.L.P.

(57) ABSTRACT

A traffic regulation system and method which combines energy harvesting from the movement of a plurality of vehicles on a roadway with wireless directional power beam transmission using the harvested energy to encourage compliance with traffic regulations. Electric power is generated from the movement of the moving vehicles by using a wind turbine to harvest wind energy from the movement of vehicles or by piezoelectric plates which harvest compression energy from the weight of the vehicle tires on the road surface. The electric power is transmitted to electric or hybrid vehicles which comply with the traffic regulations. The traffic regulations are one of driving at a posted speed and driving at a safe following distance. A control system adjusts the traffic regulation based on measurements received from a plurality of detectors.

20 Claims, 11 Drawing Sheets

(56) References Cited

U.S. PATENT DOCUMENTS

| | | | |
|---|---|---|---|
| 2014/0300250 A1 | 10/2014 | Ramirez | |
| 2015/0094888 A1* | 4/2015 | Hyde | B60L 53/51 |
| | | | 701/22 |
| 2018/0253964 A1* | 9/2018 | Wong | G08G 1/096758 |
| 2019/0044413 A1* | 2/2019 | Mokoenene | H02K 7/1823 |
| 2019/0118659 A1* | 4/2019 | Gou | H01M 10/44 |
| 2019/0206239 A1* | 7/2019 | Guan | G08G 1/015 |

OTHER PUBLICATIONS

Lancaster University ; Developing roads that can generate power from passing traffic ; EurekAlert! Science News ; Sep. 18, 2017 ; 2 pages.

Gordon, et al. ; Traffic Control Systems Handbook: Chapter 6. Detectors ; FHWA Office of Operations ; 14 pages.

Vortexis Vawt 10W-300W, Micro & Nano Wind Energy Solutions ; Vortexis Wind Energy Solutions ; https://www.vortexis.com/features.html ; 1 page.

Edery-Azulay ; Innowattech: Harvesting Energy Data A stand alone technology ; Innowattech Energy Harvesting Systems ; Nov. 1-3, 2010 ; 9 pages.

Tian, et al. ; Numerical Simulations of a VAWT in the Wake of a Moving Car ; Energies 10 (4) ; 2017 ; 30 pages.

Kozel • Interstate 495 in Virginia ; Lead article: Interstate High way System in Virginia ; Dec. 21, 2003 ; 2 pages.

\* cited by examiner

TRAFFIC CONTROL SYSTEM USING WIRELESS POWER CHARGING

BACKGROUND

Technical Field

The current disclosure is directed to a traffic regulation system and method which combines energy harvesting from the movement of a plurality of vehicles on a roadway with wireless directional power beam transmission using the harvested energy. An electric or hybrid vehicle which is in compliance with traffic regulations may receive the transmitted energy.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Traffic accidents increase dramatically in areas where compliance with traffic regulations is disregarded. Speeding is the leading cause of traffic accidents in some countries. Further types of traffic violations are following too closely, running red lights, not wearing seatbelts, weaving in and out of lanes, etc. Traffic regulation is a main concern in order to have safer highways.

Vehicles following too closely or tailgating is one of the top causes of automobile collisions. Tailgating is the fifth leading cause of auto collisions according to the U.S. Department of Public Safety. Drivers have been encouraged to follow the "Two-second Rule" in which the driver's vehicle should pass a fixed object two seconds after the car ahead of it when travelling at a speed of 65 mph. However, this distance varies with driving conditions. A safer guideline is shown in Table 1.

TABLE 1

Safe following distances at different speeds with respect to roadway driving conditions.

| Speed (mph) | Distance between vehicles (seconds) | Driving Condition |
|---|---|---|
| 35-55 | 3 | Ideal |
| 55-75 | 4 | Ideal |
| 35-75 | 4 | Rain |
| 35-75 | 4 | Heavy traffic |
| 35-75 | 7-8 | Icy or snow covered |

Many different attempts have been made to facilitate the detection of traffic violations. U.S. 2010/0271497 describes a camera coupled to a portable base unit. A control system identifies a traffic violation, such as speeding, in a traffic monitoring location and controls a camera for capturing an image of a vehicle owner or a vehicle, corresponding to the traffic violation. A storage device stores the image captured by the camera. Speed is detected by a speed detection unit mounted on a pole in the vicinity and a ticket is sent to the driver when the speed limit is violated.

Further, efforts have been made to gather information on roadway events, such as traffic density, traffic speed, accidents, traffic slow downs, construction, emergency situations, and roadway predictions, such as terrorist attacks.

Traffic movement detection can be accomplished in a variety of ways. A detector for measuring the movement of vehicles on the roadway can be any of a still camera, a video camera, an array of cameras, an inductive loop, a magnetic sensor, an acoustic sensor, a laser beam, an infrared beam, a motion detector, a pneumatic tube, a piezoelectric sensor, a Doppler microwave sensor or a radar microwave sensor, as described by Windmill Software Ltd. http://www.windmill.co.uk/vehicle-sensing.html.

CN106297274 provides an intelligent streetlight combined with an urban road prediction method. The intelligent streetlight is provided with an information display, an environmental monitoring device, a broadcasting apparatus, a video monitoring apparatus, a traffic signal light, a road light and a 4G base station thereon. The intelligent streetlight integrates a video monitor, a 4G base station, an environmental monitor, an inductive charger for charging electric or hybrid vehicles and a traffic light. The streetlight monitors the traffic load, traffic events, such as accidents or road construction, emergency situations, vehicle status information and environmental information and calculates the transit time of the road. The vehicle status information includes license plate information, lane in which the vehicle is travelling, speed and direction of travel. This information is transmitted by the 4G base station to an urban intelligent traffic system, thus providing real-time road monitoring.

With regards to electric or hybrid vehicles, a limiting factor in their use is the need to stop the vehicle for long amounts of time to recharge the batteries. In order to extend the driving time of the vehicle, it has been proposed to wirelessly charge the vehicle while the vehicle is driving on a roadway.

U.S. Pat. No. 6,114,834 describes a remote charging system for use with an electrical storage device mounted in an electric or electric/hybrid vehicle. The system includes a power transmission unit capable of transmitting electrical energy to a rechargeable electrical storage device via a wireless energy beam, such as microwaves, radio frequency (RF) wavelengths, millimeterwaves or optical frequencies, such as a laser based system. The vehicle includes an antenna capable of receiving the wireless energy beam and charging the storage device. The vehicle further includes a translocator for transmitting a coded signal to the power transmission unit corresponding to the location of the vehicle and thereby activating the power transmission unit. The power transmission unit receives and locks onto the coded signal and thereby tracks the vehicle during the charging operation. The translocator signal is transmitted until the electrical storage unit reaches a predetermined level of charge. In the example of a bus having a 195 kW (277 hp) electric motor, a power transmission unit is placed within 1km of the bus. During the time the bus is within 150 m of the power transmission unit, the amount of energy that can be transferred via wireless power transmission and stored in the vehicle battery is approximately 150 kW, accounting for transmission losses. At 55 km/hr, the energy storage unit will receive 0.8182 kW-hr of recharge energy as it passes the transmission unit. As the bus uses 0.6364 kW-hr of electricity to traverse the 300 m distance to and from the transmission unit, the storage unit receives a net charge of approximately 0.2 kW-hr over the traverse.

Energy due to the movement of vehicles on the roadway can be harvested by inductive or piezoelectric plates placed in the roadway. Further, wind turbines operated by the air turbulence produced by moving vehicles can generate electricity.

U.S. 2014/0300250 discloses a system and a method of generating electrical power from moving cars driving over piezoelectric sensor strips on the road to power lights, sensors, speed detection cameras, motion cameras and power infrastructure, such as AC or DC power generators; and may transmit power generated by vehicle movement towards a power transmission infrastructure created near the roadways. The energy generated during motion of a mass averaging 300 kg to 50 tons on each piezoelectric sensor may range between 0.0005 and 1.5 watts during 0.5 seconds on average, respectively. The voltage that can be rectified per sensor may range between 0.2 and 80 volts, where power losses caused by the connection of each piezoelectric material with each connector may range between 7 to 30% of the total power generated by the piezoelectric material. As there are 67 sensors in each 15 m long sensor strip, a vehicle passing over the sensor strip generates 0.0335 W.

Systems for generating electric energy from the wind produced by passing vehicles can generate electric energy that is used to power street lamps, traffic lights and electric car charging points. The wind energy can total around one to two Megawatts per kilometre under 'normal' traffic volumes, at 2,000 to 3,000 cars an hour. This amount of energy, when stored, is the amount needed to power between 2,000 and 4,000 street lamps. The system then converts this mechanical energy into electric energy to power units such as street lamps, traffic lights and electric car charging points. It can also be used to provide real-time traffic volume monitoring.

A vertical axis wind turbine is described by Tian et al., "Numerical Simulations of a VAWT in the Wake of a Moving Car" in Energies 2017, 10(4) p. 478, https://doi.org/10.3390/en10040478. The VAWT is designed to be placed on the median of the highway, therefore the wind on both sides of the median will contribute to the output of the turbine. As vehicle speed increases, the amount of wind and air turbulence available for turning the wind turbine increases, thus the angular velocity of the wind turbine increases as the speed of the vehicle increases.

A heavily travelled road in the United States may carry 200,000 vehicles or more per day. http://www.roadstothefuture.com/I495_VA_Desc.html. Thus, a conservative estimate of the amount of electricity that can be generated by 200,000 vehicles is about 8 MJ per day using a wind turbine, and about 6.7 KW per day using piezoelectric plates. 8 MJ per day is equivalent to approximately 690 KW per day.

Further, it has been shown that electric or hybrid vehicles can be charged wirelessly while driving on a roadway. The wireless power can be transmitted from overhead, from the road surface or from the side of the roadway.

U.S. Pat. No. 8,030,888 describes a wireless charging system for vehicles which charges the vehicle while it travels on a road surface. The vehicle is equipped with a magnetic resonance coupling system on the undercarriage of the vehicle. The vehicle undercarriage may also include photosensor panels to receive laser beam radiation. An inductive charger generates electricity from the wireless beam, which is transferred to the storage battery of the vehicle. The wireless beam must be within a few meters of the inductive charger. Although a moving vehicle may be in range for only a few seconds, multiple, spaced transmitters on the roadway could provide a constant charge over the roadway distance. The wireless beam may be an infrared laser, and the wireless charger may be a photovoltaic panel which receives the light and converts it to electricity, which is stored in the vehicle's battery. High efficiency of wireless transfer can be achieved due to tight directional control of laser beam. This reference does not mention harvesting energy to power the wireless beams or any means for traffic control.

The remote vehicle charging system of the current disclosure utilizes a wireless power transmission network to charge on-board electrical energy storage systems. The network of can be established on existing power line and telephone poles or new stand-alone poles for use in conjunction with the existing poles. Energy harvested from vehicle motion powers the wireless power transmission network.

It should be noted that none of the aforementioned documents utilizes energy generated from the moving vehicles to control the speed of at least some of the vehicles that generate the air turbulence from which the energy is generated, e.g., the speed to vehicles in traffic. A system is needed which encourages compliance with traffic regulations. In the present disclosure, a compliant vehicle which obeys a speed limit and/or keeps a proper distance from a vehicle in in front of the compliant vehicle is wirelessly charged by a beam of energy transmitted towards an energy transducing receiver on the compliant vehicle. The invention of the present disclosure encourages drivers to obey speed limits and keep a proper distance between their vehicle and others in traffic in order to receive the transmitted energy. An additional benefit is that drivers will be encouraged to drive during times of lower traffic density in order to comply with the "two second rule". Furthermore, the speed settings can be adapted to road conditions, such as rain, snow, school zones and construction, and can be displayed to drivers to improve driver safety.

These improvements will encourage drivers to drive more safely. Other benefits are cleaner air from harvesting energy from non-polluting sources, enhanced traffic control, extended battery charge of electric and hybrid vehicles, thus reducing hydrocarbon emissions, and safer highways due to increased driver compliance with traffic regulations.

SUMMARY

The present disclosure relates generally to a traffic regulation system and method of harvesting energy from the movement of a plurality of vehicles on a roadway and transmitting a directional wireless power beam to other moving vehicles that obey a traffic regulation. The traffic regulation may be compliance with a speed limit or a safe driving distance between vehicles. In other embodiments, traffic measurements are transmitted to a traffic management authority regarding the occurrence of an event in the vicinity of the particular location, such as a traffic accident, a fault in the road, a terrorism act/crime or the occupancy state of a parking lot. The traffic management authority can send notifications of upcoming road conditions to the traffic regulation system. The speed limit can be adjusted due to road conditions and displayed to drivers.

In a first embodiment, a traffic regulation system is provided. The traffic regulation system includes at least one energy harvester to harvest energy from the movement of a plurality of vehicles on a roadway and at least one power transmission unit operatively connected to the energy harvester to receive harvested energy and store the harvested energy in a power transmission unit storage battery. The power transmission unit includes a power transmitter configured to transmit a directional wireless power beam using the harvested energy from the storage battery. At least one detector is configured to track and measure the movement of at least one vehicle of the plurality of vehicles. A control system operatively connected to the at least one detector and the power transmission unit has circuitry configured to determine whether the at least one vehicle is compliant with at least one traffic regulation based on the measurement of the at least one detector and to actuate the power transmitter unit to transmit a directional wireless power beam to the identified vehicle based on the identified vehicle being in compliance with the at least one traffic regulation.

According to a second embodiment, a method of traffic regulation is provided. The method includes harvesting energy, with at least one energy harvester, from the movement of a plurality of moving vehicles on a roadway. The method continues by receiving the harvested energy at a power transmission unit configured for storing the harvested energy in a power transmission unit storage battery. The power transmission unit has a power transmitter for transmitting a directional wireless power beam using the harvested energy stored in the storage battery. A detector, configured for tracking and the movement of at least one vehicle of the plurality of vehicles, generates at least one first set of tracking and measurement signals. The tracking and measurement signals are received by a control system operatively connected to the detector and the power transmission unit, the control system having circuitry configured for analysis of the tracking and measurement signals. The method continues by determining, with the control system, whether the at least one vehicle is in compliance with at least one traffic regulation based on the signals; and actuating the power transmitter to transmit a directional wireless power beam to the at least one vehicle based on the at least one vehicle being in compliance with the at least one traffic regulation.

In both the system and method, the traffic regulation is either compliance with a posted driving speed or compliance with a safe driving distance between the at least one vehicle and a second vehicle directly in front of the at least one vehicle.

According to another aspect of the current disclosure, the traffic regulation system includes a communication unit, a base station and a display. The display is located as to be visible when viewed from one of the plurality of moving vehicles. The movement of the plurality of vehicles on the roadway may be transmitted to a traffic management authority. Notifications from the traffic management authority are received by the traffic regulation system and displayed to notify drivers of traffic events. The notifications may also be used by the controller to update the traffic regulation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
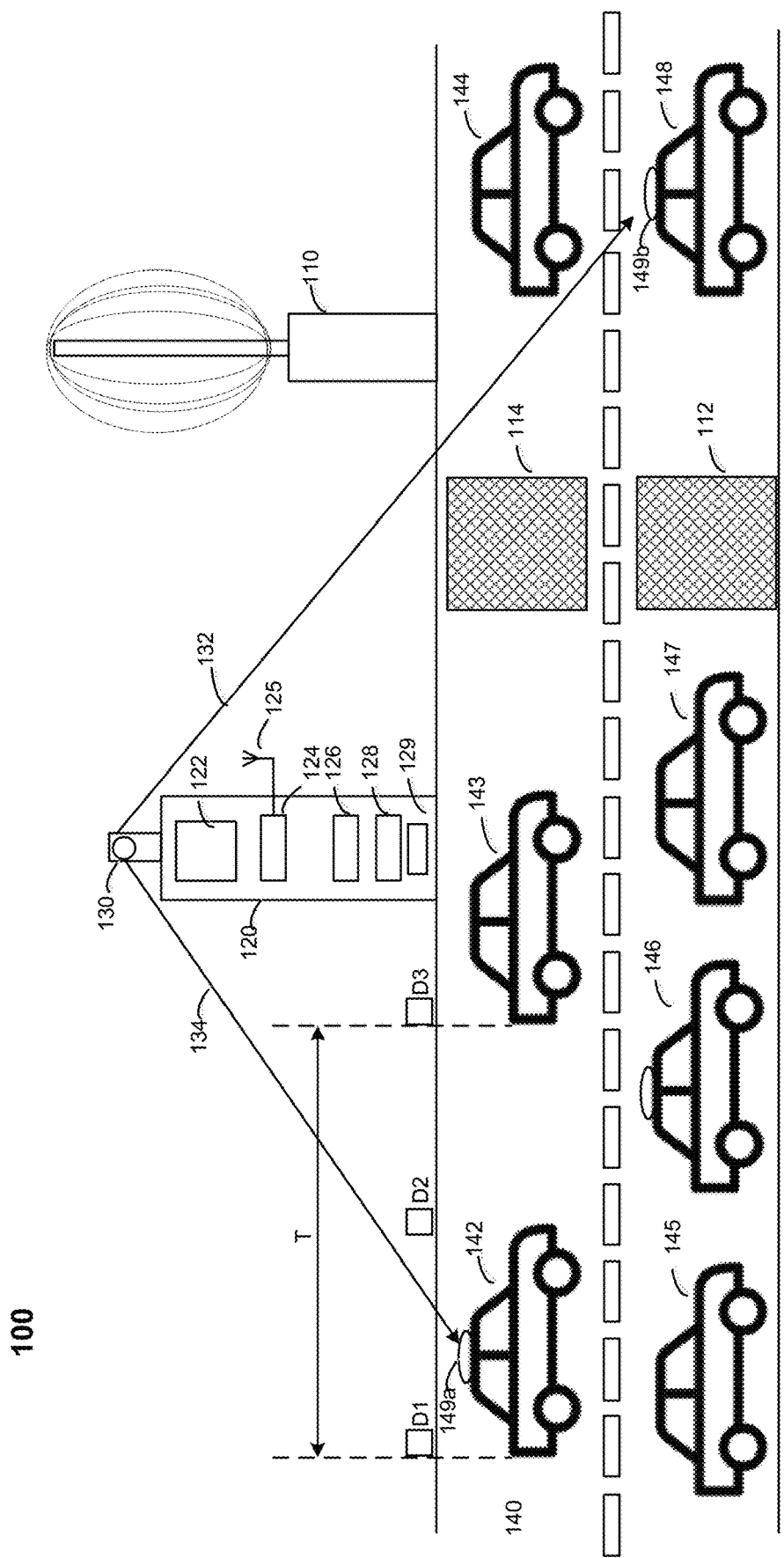
FIG. 1 is an exemplary illustration of a traffic regulation system having a power transmitter located at the side of a roadway, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

An electric vehicle, as referred to in the disclosure, is a vehicle having an electric motor for propulsion. The vehicle has a storage battery, typically a lithium battery, which is recharged by various means, such as direct connection to a power source, magnetic induction through a receiving coil, a photovoltaic panel which receives light from a laser, etc.

A hybrid vehicle includes a gasoline motor and an electric motor.

Aspects of this disclosure are directed to a system and method for traffic regulation.

The present disclosure is drawn generally to a traffic regulation system which encourages compliance with at least one traffic regulation. The traffic regulation may be to drive at a posted speed or to keep a safe following distance between a driver's vehicle and a vehicle in proximity to and preferably directly in front of the driver's vehicle. When the driver's vehicle is in compliance with the traffic regulation and the vehicle is an electric or hybrid vehicle, a wireless directional power beam locks onto a receiver on the vehicle and charges a storage battery within the vehicle. The battery may be a vehicle storage battery and/or an electronic device within the vehicle which are operatively connected to the charging system.

Energy is harvested from the movement of vehicles on the roadway. The energy may be harvested from wind energy produced by the moving vehicles which turns a wind turbine to generate electric current.

The wind turbine described in the present disclosure is a vertical axis wind turbine. In a non-limiting example, the vertical axis wind turbine can be of the type VAWT 10W-

300W manufactured by Vortexis, Inc., Palm City, Fla., United States. https://www.vortexis.com/features.html. In a further non-limiting example, the vertical axis wind turbine can be a Savonius wind turbine, of the type described in U.S. patent application 20140079534 incorporated herein by reference in its entirety. However, the wind turbine may be of the type having a horizontal axis. A non-limiting example of a horizontal wind axis is described in U.S. Pat. No. 6,064,123, incorporated herein by reference in its entirety.

The power generated from the air wake of the moving vehicles can be calculated as follows: $P=0.5\rho AV^3 C_p$, where $\rho$ is the air density and equals 1.23 kg/m$^3$, A is the swept area in m$^2$, V is the vehicles's air draft speed, $C_p$ is the power coefficient equal to 0.59, and which has a maximum limit called the Betz limit.

TABLE 2

Energy in Watts generated at wind speeds of 5-40 m/s for $C_p$ values of 0.4-0.59.

| Wind Speed | Cp | | | | |
|---|---|---|---|---|---|
| | 0.4 | 0.45 | 0.5 | 0.55 | 0.59 |
| 5 | 24.19 | 27.21375 | 30.2375 | 33.26125 | 35.68025 |
| 10 | 193.52 | 217.71 | 241.9 | 266.09 | 285.442 |
| 15 | 653.13 | 734.7713 | 816.4125 | 898.0538 | 963.3668 |
| 20 | 1548.16 | 1741.68 | 1935.2 | 2128.72 | 2283.536 |
| 25 | 3023.75 | 3401.719 | 3779.688 | 4157.656 | 4460.031 |
| 30 | 5225.04 | 5878.17 | 6531.3 | 7184.43 | 7706.934 |
| 35 | 8297.17 | 9334.316 | 10371.46 | 11408.61 | 12238.33 |
| 40 | 12385.28 | 13933.44 | 15481.6 | 17029.76 | 18268.29 |

Alternatively, the energy may be harvested by piezoelectric plates embedded in the roadway. Compression of piezoelectric sensors by the tires of the vehicles generates an electric current. In a non-limiting example, the piezoelectric plates can be of the type described by Innowattech, Tel Aviv, Israel. https://www.iroads.co.il/sites/default/files/mtsgt_1_innowattech_presentation_-lucy_edery-azulay.pdf.

The energy generated by the piezoelectric plates can be calculated as shown by Shu and Lien in "Analysis of power output for piezoelectric energy harvesting systems", Smart Mater. Struct. 15 (2006) 1499-1512.

The electric current is stored in a storage battery of the traffic regulation system and used to power the wireless directional power beam. The wireless directional power beam may be placed on an overhead support, such as shown by U.S. Pat. No. 6,114,834, incorporated herein by reference in its entirety. The wireless directional power beam may be embedded in the road surface, such as described in U.S. Pat. No. 8,030,888, incorporated herein by reference in its entirety.

The harvested energy may additionally power any of a display, a traffic light, a detector, a communication unit, a base station and a control system connected to the traffic regulation system, as a few non-limiting examples.

At least one detector tracks and measures the movement of each vehicle passing the detector. In a non-limiting example, the detector may track the movement by measuring the amplitude of the measurement with respect to time as the vehicle passes the detector. In another non-limiting example, a plurality of detectors may provide timestamps of the vehicle passing over or beside the detector. Additionally, the detector may have circuitry configured to lock upon a vehicle location signal on a tracked vehicle and make measurements, such as speed, timestamping, or distance travelled according to the vehicle location signal. As a non-limiting example, the detector is any of the types described by the U.S. Department of Transportation, Federal Highway Administration Traffic Control Systems Handbook in "Chapter 6. Detectors". https://ops.fhwa.dot.gov/publications/fhwahop06006/chapter_6.htm.

The detector transmits the tracking and measurement signals to a control system for analysis of the signals.

FIG. 1 shows the first embodiment of the traffic regulation system with an energy harvesting system harvesting wind energy and compression energy. At least one energy harvester in the form of a wind turbine 110 harvests energy from the movement of a plurality of vehicles (142-148) on a two lane roadway 140. The vehicles are shown for clarity as perpendicular to the roadway, with tires touching the roadway. At least one power transmission unit 120 is operatively connected to the energy harvester 110 to receive harvested energy and store the harvested energy in a storage battery 129.

In FIG. 1, a second energy harvesting system is shown in the form of an array of piezoelectric sensors (112, 114) embedded in the roadway beneath the plurality of moving vehicles, wherein each piezoelectric sensor generates an electric current when compressed by at least one vehicle of the plurality of vehicles driving over the array, and wherein the electric current charges the storage battery 129.

The power transmission unit 120 includes a power transmitter 130 which is configured to transmit a directional wireless power beam (132, 134) using the harvested energy from the storage battery.

In the first embodiment, the power transmission unit is located at the side of the roadway, and the power transmitter 130 transmits the directional wireless power beam to the at least one vehicle from above the vehicle. The power transmitter 130 may be at the top of the power transmission unit as shown in FIG. 1, or may be directly above the vehicles, supported on a cable, such as that which holds a stoplight (not shown).

At least one detector (D1, D2, D3) is configured to track and measure the movement of at least one vehicle of the plurality of vehicles. The at least one detector is wired or wirelessly connected to a control system 128.

The control system 128 is operatively connected to the power transmission unit 120. The control system has circuitry configured to determine whether the at least one vehicle is in compliance with at least one traffic regulation based on the measurement of the at least one detector and to actuate the power transmitter to transmit a directional wireless power beam (130, 132) to the identified vehicle based on the identified vehicle being in compliance with the at least one traffic regulation. The traffic regulation relates to compliance with a posted driving speed and/or compliance with a safe following distance between the at least one vehicle and a second vehicle directly in front of the at least one vehicle.

In FIG. 1, a wireless directional power beam 134 is shown directed to vehicle 142, which is travelling a safe following distance behind vehicle 143. The travelling time representing the distance between the vehicles is set by the control system 128 and may be 0 seconds (when stopped) to 10 seconds, 2 seconds to 8 seconds, and is preferably 3 seconds for ideal driving conditions at less than 55 mph. Safe following distances at different speeds are shown in Table 1. The safe following distance may additionally be set depending on traffic density. When traffic is very dense, it may not be possible to keep a 3 second space between vehicles. Therefore, the control system may adjust the posted speed to a lower value, while allowing the safe following distance to fall to compensate for the high traffic density. At a lower speed, the safe following distance may be represented by a 2 second space between vehicles.

Referring to FIG. 1, a wireless directional power beam 132 is shown directed to vehicle 148, which is also travelling at a safe following distance. The control system 128 may direct the power transmitter to transmit a higher intensity beam to vehicle 142 than to vehicle 148 in the situation where vehicle 142 is driving at both the safe following distance and the posted speed, but vehicle 148 is travelling at greater than the posted speed, yet compliant with the safe following distance.

In the first embodiment, the control system 128 further has circuitry configured to determine whether the at least one vehicle is equipped with a power receiver (149a, 149b) configured to receive the directional wireless power beam. The power receiver is located on a roof of the at least one vehicle and the power receiver charges at least one of a vehicle storage battery and an electronic device inside the at least one vehicle upon receiving the directional wireless power beam. The control system is further configured to exchange signals with the power receiver and determine the capabilities of the power receiver.

Figure 2:
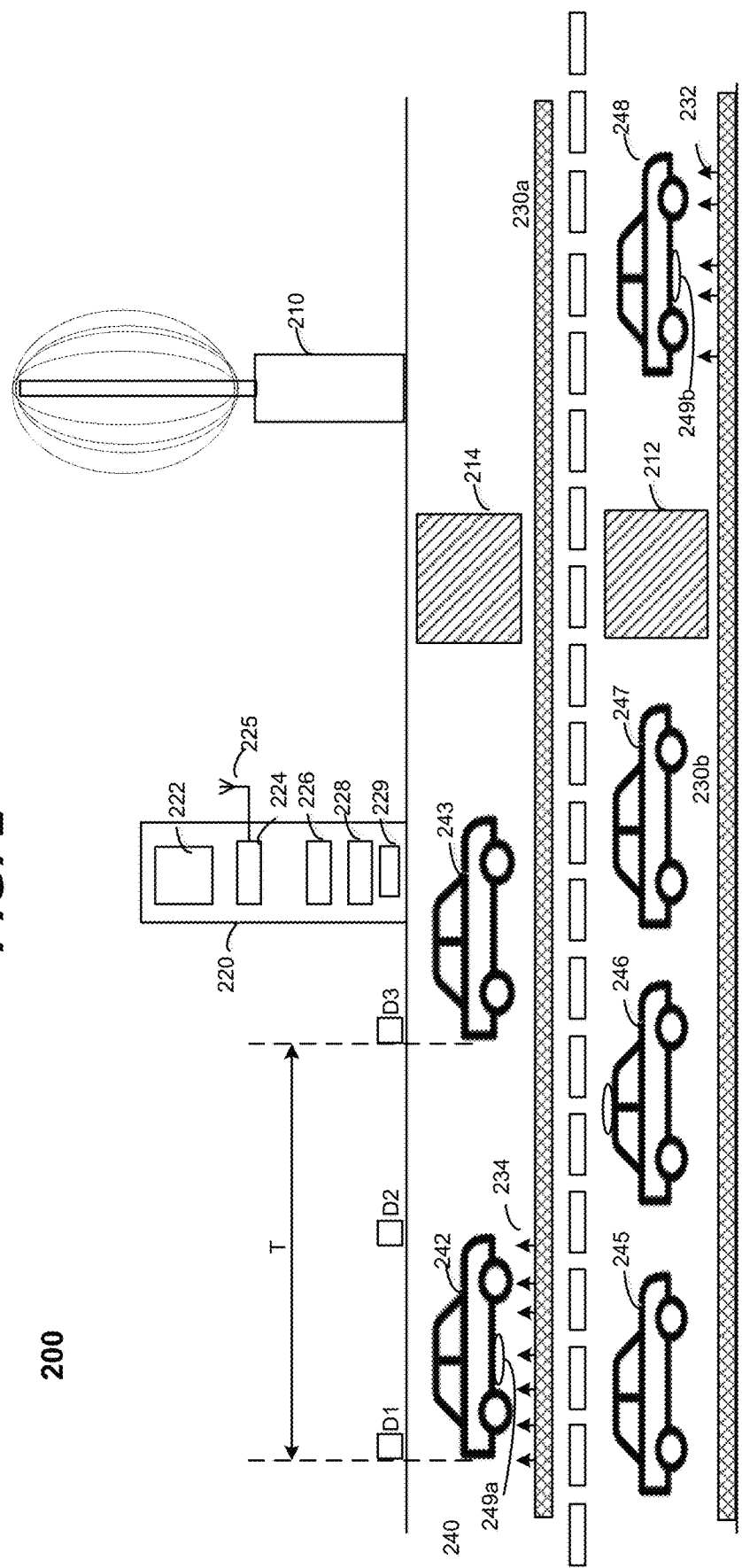
FIG. 2 is an exemplary illustration of a traffic regulation system having a power transmitter embedded in a roadway, according to certain embodiments.

Referring now to FIG. 2, a second embodiment of the traffic regulation system is shown. In describing FIG. 2, the power transmission unit, controller, battery, wind turbine, roadway, vehicles, detectors and piezoelectric plates are essentially the same as described with respect to FIG. 1.

In FIG. 2, a wireless transmitter 230a is embedded in a first lane of the roadway 240, and a wireless transmitter 230b is embedded in a second lane of the roadway. A wireless directional power beam 234 is shown directed to vehicle 242, which is travelling a safe following distance behind vehicle 243. The travelling time representing the distance between the vehicles is set by the control system 128 and may be 0 seconds (when stopped) to 10 seconds, 2 seconds to 8 seconds, and is preferably 3 seconds, or any fraction thereof, for ideal driving conditions at less than 55 mph. Safe following distances at different speeds are shown in Table 1. The safe following distance may additionally be set depending on traffic density. When traffic is dense, it may not be possible to keep a 3 second distance between vehicles. Therefore, the control system may adjust the posted speed to a lower value, while allowing the safe following distance to fall to compensate for the high traffic density.

Referring to FIG. 2, a wireless directional power beam 232 is shown directed to vehicle 148, which is also travelling at a safe following distance. The control system 228 may direct power transmitter 230a to transmit a high intensity beam to vehicle 242 when vehicle 242 is driving at both the safe following distance and the posted speed. The control system may direct power transmitter 230b to transmit a lower intensity beam (the lower intensity beam depicted as 232 having fewer arrows than 234) to vehicle 248 which is travelling at greater than the posted speed, yet compliant with the safe following distance. In this embodiment, the power transmitter may beam power only when a compliant vehicle passes over a portion of the power transmitting strip. This will save energy as well as ensure a non-compliant vehicle does not receive the beamed power.

In the second embodiment, the control system 228 further has circuitry configured to determine whether the at least one vehicle is equipped with a power receiver (249a, 249b) configured to receive the directional wireless power beam (232, 234). The control system is further configured to exchange signals with the power receiver and determine the capabilities of the power receiver.

The power receiver (249a, 249b) is located on an undercarriage of the at least one vehicle; and the power receiver charges at least one of a vehicle storage battery and an electronic device inside the at least one vehicle upon receiving the directional wireless power beam (232, 234).

In both the first and second embodiments shown in FIG. 1 and FIG. 2, the power transmitter (130, 230a, 230b) is at least one of a radio frequency antenna, a microwave antenna, an inductive coil, a millimeter wave antenna, and a laser. The power transmitter may transmit both RF power signals and a laser beam, or any combination of inductive, microwave and RF and laser. The power receiver (149a, 149b, 249a, 249b) may be at least one of an inductive receiver, a microwave receiver, an RF receiver, a millimeter wave receiver or an array of photocells. The power receiver may be a combination of any of at least one of the inductive receiver, microwave receiver, RF receiver and millimeter wave receiver with an array of photocells.

In both the first and second embodiments shown in FIG. 1 and FIG. 2, the at least one detector (D1, D2, D3) is at least one of a still camera, a video camera, an array of cameras, an inductive loop, an electromagnet, a magnetic sensor, an acoustic sensor, a laser beam, an infrared beam, a motion detector, a pneumatic tube, a piezoelectric sensor, a Doppler microwave sensor and a radar microwave sensor, which are well known in the art.

In both the first and second embodiments shown in FIG. 1 and FIG. 2, the control system (128, 228) is operatively connected to a communication unit (126, 226) including a base station (124, 224) having a communications antenna (125, 225).

The control system is further configured to determine at least one traffic event from the detector measurements and tracking information. The control system causes the at least one traffic event to be transmitted to a traffic management authority by the base station of the communication unit. The communication unit receives notifications from the traffic management authority of traffic information in the vicinity of the traffic regulation system. The control system is further configured to determine at least one further traffic event based on the at least one traffic event and the notifications. The at least one further traffic event is at least one of a traffic slowdown, a traffic accident, a crime, a terrorism act, a weather warning, a traffic accident, a construction zone, a fault in the roadway, and an occupancy of a parking lot near the roadway.

In the first embodiment shown in FIG. 1, the traffic regulation system comprises a support structure for housing the control system 128, communication unit 126, base station 124, power transmission unit 120, power transmission unit storage battery 129 and power transmitter 130. The support structure is located at the side of the roadway.

The support structure further includes a display 122 operatively connected to the control system 128, wherein the display is located at the top of the support structure and configured as to be visible when viewed from the plurality of vehicles. The control system actuates the display 122 to notify drivers of the plurality of vehicles of at least one of a posted speed, a safe following distance, a seatbelt monitoring zone, a traffic slowdown, a traffic accident, a crime, a terrorism act, a weather warning, a construction zone, a fault in the roadway and an occupancy of a parking lot near the roadway.

In the second embodiment shown in FIG. 2, the support structure houses the control system 228, communication unit 226, base station 224, power transmission unit 220, storage battery 229 and a display 222 operatively connected to the control system 228. In the second embodiment, the power transmitter (230a, 230b) is embedded in the roadway and connected by cables to the power transmission unit.

In the second embodiment, the display is located at the top of the support structure and configured as to be visible when viewed from the plurality of vehicles. The control system actuates the display 222 to notify drivers of the plurality of vehicles of at least one of a posted speed, a safe following distance, a seatbelt monitoring zone, a traffic slowdown, a traffic accident, a crime, a terrorism act, a weather warning, a construction zone, a fault in the roadway and an occupancy of a parking lot near the roadway.

In both of the embodiments of FIG. 1 and FIG. 2, the communication unit (126, 226) including a base station (124, 224) sends the traffic tracking and measurement signals to a traffic management authority. The traffic management authority sends traffic information to the traffic regulation system. The control system (128, 228) receives the traffic information and updates the posted speed, which is displayed to the drivers. Additionally, the control system may use the traffic information to provide alerts to drivers regarding events on the highway, such as "Accident in 50 ft. Stay in left lane", "Amber alert. White van, 2018, tag number XLS354", or "Road closed ahead. All traffic Exit 17".

As this system utilizes existing road infrastructure, it can use the generated power to perform additional traffic control using associated sensors to monitor accidents and to communicate with the responsible authorities (police, ambulance, fire station, and more). Also this system can be equipped with special sensors to monitor the quality of road such as new road cracks or accumulated rainwater. The system may include environmental sensors. Information from the environmental sensors can be used by the control system to determine the posted speed or safe following distance. Also, this system can help in anti-terrorism activities and parking lot management.

In a further aspect, a plurality of traffic regulation units and energy harvesters is included. The traffic regulation units may communicate with the traffic management authority to provide continuous traffic information along the roadway. Power transmitters may provide energy to qualifying vehicles for many miles along the roadway. A highway lane may be designated a "Charge Lane" in which only hybrid or electric vehicles may travel and receive the benefit of charging by the power beam. Such a system would have the additional benefit of encouraging drivers to buy electric or hybrid vehicles.

Figure 3:
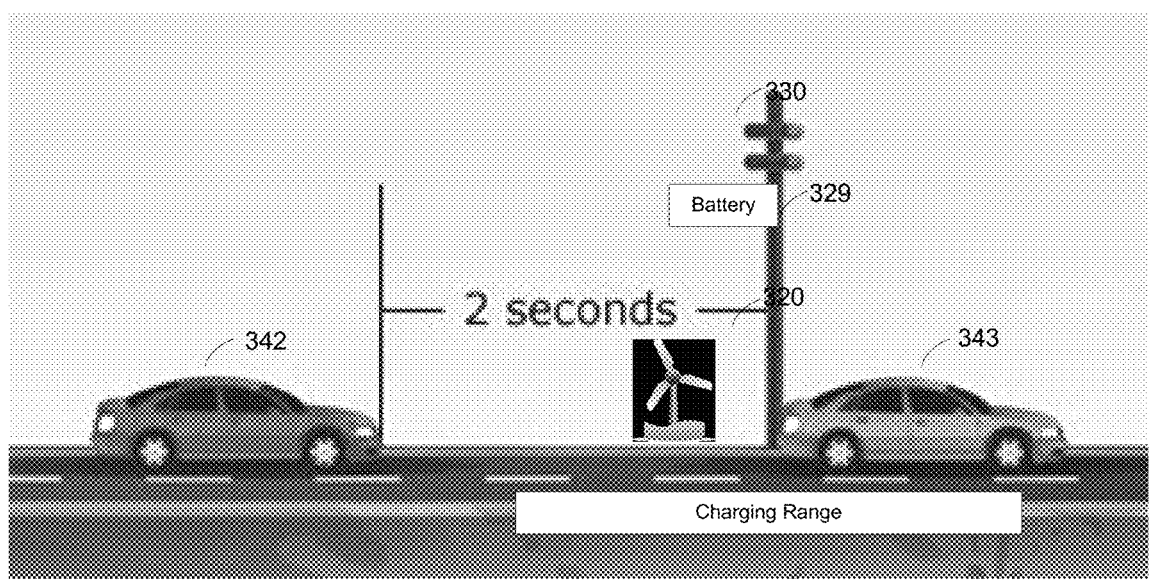
FIG. 3 is an illustration of vehicles with a two second spacing between the vehicles.

As shown in FIG. 3, the "two second rule" is pictorially represented. The wind turbine is shown which charges a storage battery 329 in a power transmission unit 320 when a vehicle which is compliant with the two second rule enters the charging range of the power transmission unit.

Figure 4A:
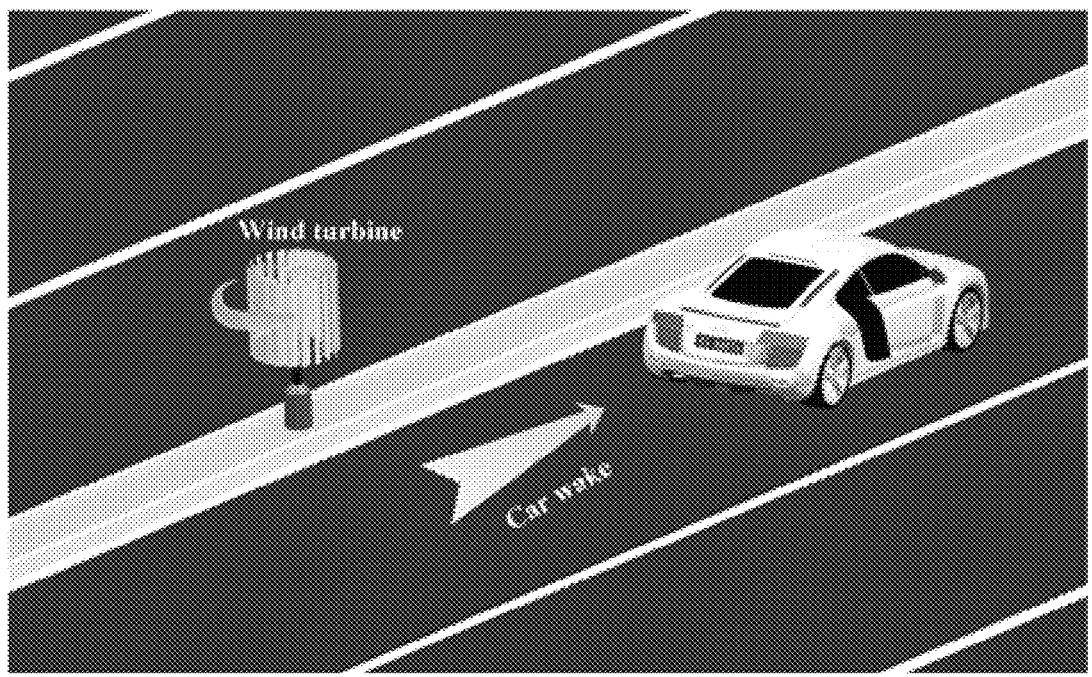
FIG. 4A is an illustration of a vehicle wake turning a wind turbine.

FIG. 4A depicts a vehicle wind wake turning a wind turbine. If the wind turbine is located on the median strip of a divided highway with traffic flow in two directions, the wind turbine will be accelerated at twice the rate, especially during periods of heavy traffic flow in both directions.

Figure 4D:
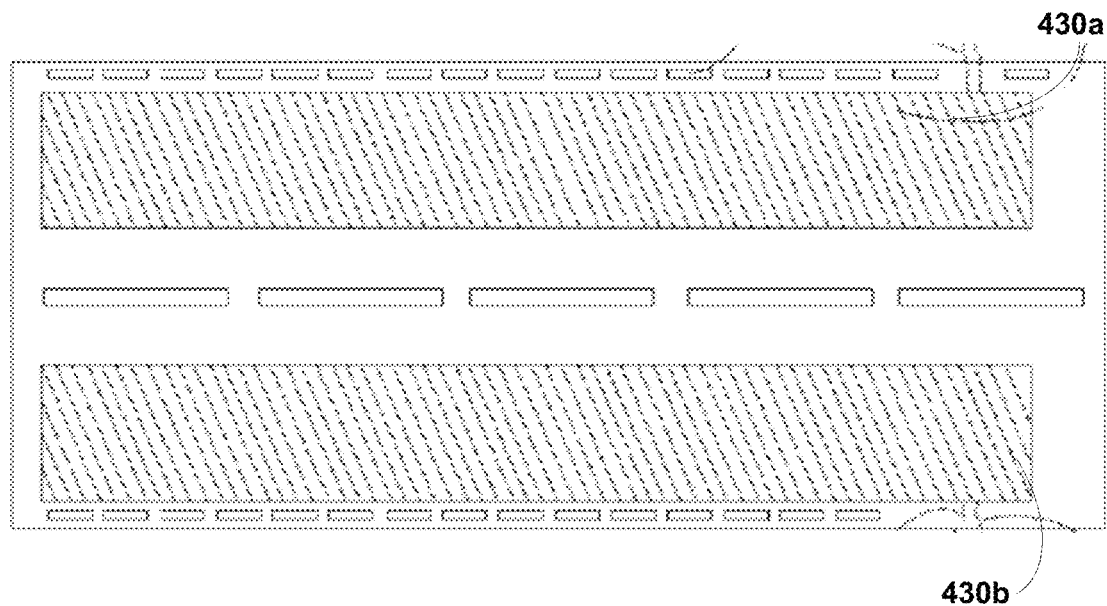
FIG. 4D is an exemplary piezoelectric pattern on a roadway, according to certain embodiments.
Figure 4B:
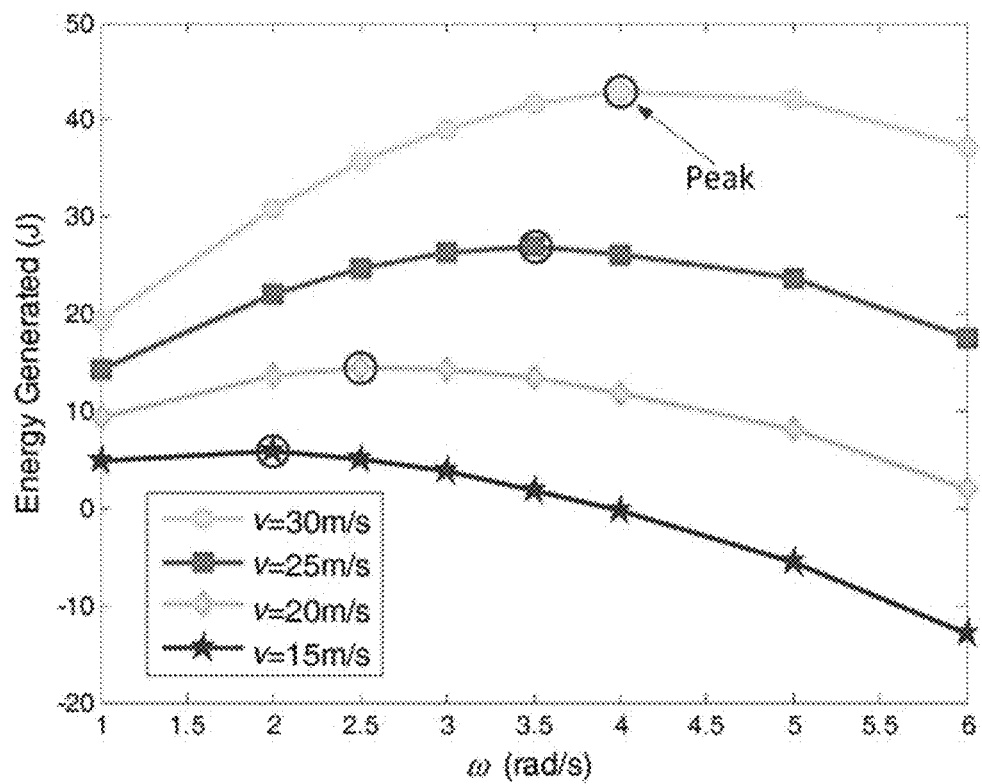
FIG. 4B is a graph illustrating the relationship between the angular momentum generated at a wind turbine and the energy generated.

FIG. 4B is a graph which plots the angular velocity of a wind turbine due to vehicles travelling at 15 m/s-30 m/s (33-67 mph). The energy generated ranges from approximately 5 joules to above 40 joules.

Figure 4C:
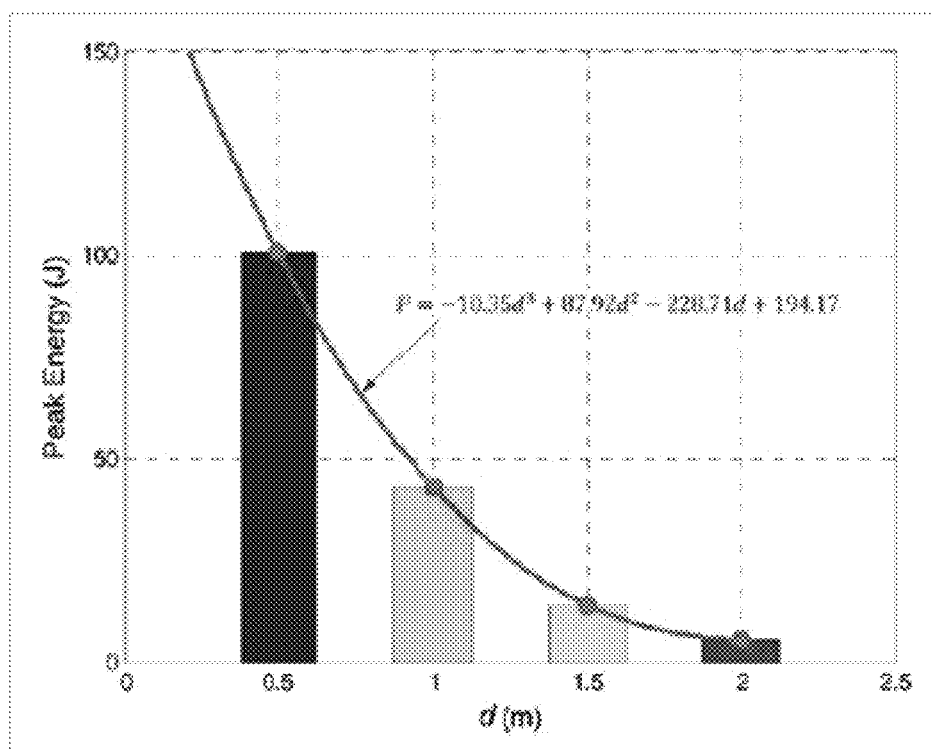
FIG. 4C is a graph illustrating the peak wake-generated energy with respect to the relative distance between a vehicle and a wind turbine.

FIG. 4C is a graph which demonstrates the drop in generated wind energy with respect to the relative distance between the vehicle and the wind turbine. From this graph it is clear that vehicles in the lanes closest to the median strip will have the greatest effect on the wind turbine angular velocity.

FIG. 4D demonstrates a non-limiting example of piezoelectric strips 430a, 430b embedded in a roadway surface. Piezoelectric strips may also be embedded in patterns, such as only beneath an area of the roadway which tires touch, intermittent patches of piezoelectric strips, or any pattern determined by road surface, curvature, drainage, location of the roadway, proximity to a traffic regulation system, cost, or other considerations.

A roadway may be equipped with a plurality of wind turbines and a plurality of piezoelectric plates. Heavily travelled roadways, some carrying as many as 200,000 vehicles per day, can conceivably generate close to 700 KW.

Figure 5:
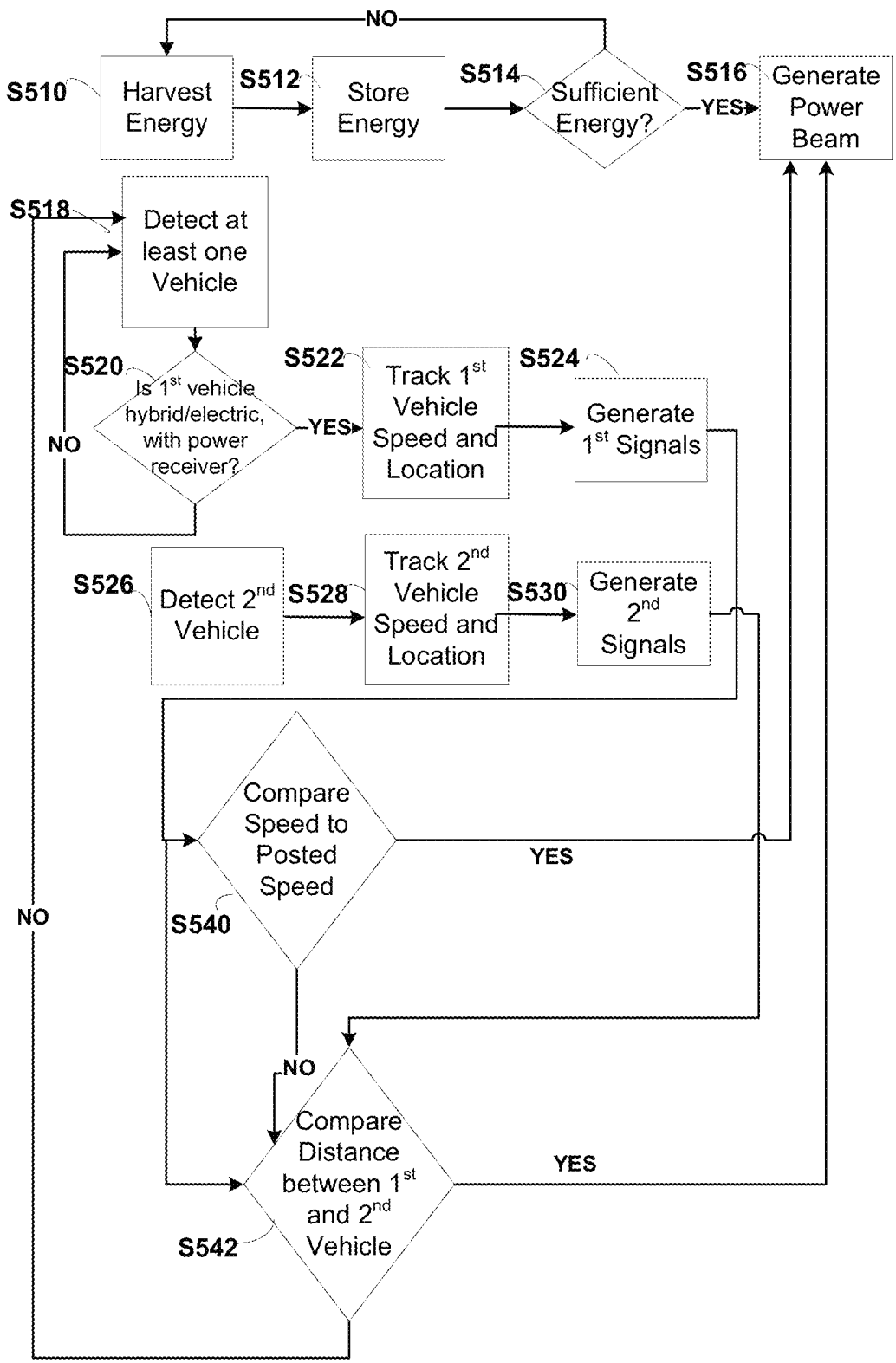
FIG. 5 is an exemplary flowchart of a method for traffic regulation, according to certain embodiments.

In a third embodiment, a method of traffic regulation is described with respect to the flowchart of FIG. 5.

The method begins by harvesting energy at S510, with at least one energy harvester, from the movement of a plurality of moving vehicles on a roadway. In step S512, a power transmission unit is configured for receiving the harvested energy and storing the energy in a power transmission unit storage battery. At step S514, the power transmission unit determines whether there is sufficient stored energy to generate a wireless directional power beam. The power transmission unit further comprises a power transmitter at S516 for transmitting the directional wireless power beam using the harvested energy stored in the storage battery.

At step S518, the method proceeds by detecting at least one vehicle of the plurality of vehicles. At decision block S520, the method involves determining whether the vehicle is a hybrid or electric vehicle and is equipped with a power receiver. In a non-limiting example, to accomplish this step, the detector sends a PING signal to the vehicle. If a return signal is received by the detector, a YES is determined and the method proceeds to S522. If no return signal is received by the detector, the method returns to S518 to detect another one of the plurality of vehicles.

At S522, the detector tracks and measures the movement of the at least one vehicle. To accomplish this step, the detector detects the speed and location of a first vehicle. The detector may detect the vehicle using at least one of a still camera, a video camera, an array of cameras, an inductive loop, an electromagnet, a magnetic sensor, an acoustic sensor, a laser beam, an infrared beam, a motion detector, a pneumatic tube, a piezoelectric sensor, a Doppler microwave sensor and a radar microwave sensor. The detector may be a single detector or a series of detectors which track the movement of the vehicle. At Step 524, the detector generates at least one first set of tracking and measurement signals.

At Step 526, at least one detector detects a second vehicle which is directly in front of the first vehicle, and determines its speed and the location at S528. At Step 530, the detector generates at least one second set of tracking and measurement signals.

The method continues at steps S540 and S542 by receiving, with a control system operatively connected to the detector and the power transmission unit, the at least one first set of tracking and measurement signals from S524. The control system has circuitry configured for analysis of the tracking and measurement signals. At this step, the control system determines whether or not the at least one vehicle is in compliance with at least one traffic regulation based on the signals. Being in compliance with the traffic regulation includes at least one of complying with a posted driving speed, as shown at S540, and complying with a safe following distance between the at least one vehicle and a second vehicle directly in front of the at least one vehicle, as shown at S542.

At S540, the first vehicle speed is compared to a posted speed stored in the memory of the control system. If the vehicle speed is less than or equal to the posted speed, and the vehicle is an electric or hybrid vehicle, the control system sends a signal to the power transmission unit to actuate the power beam at S516 to transmit a wireless directional power beam to the first vehicle. If the first vehicle speed is greater than the posted speed, the vehicle does not receive the wireless directional power beam. However, the vehicle may still receive the wireless directional power beam if it is compliant with a safe following distance with respect to the second vehicle.

At step S542, the control system is shown receiving the both the first and second tracking and measurement signals. The controller additionally receives the information that the first vehicle speed is above the posted speed. At S542, the controller compares the distance between the first and second vehicle, calculates the time it would take for the first vehicle to traverse to the current location of the second vehicle based on the speed of the first vehicle, compares the relative speeds of the first and second vehicle, and determines whether the first vehicle is compliant with a safe following distance regulation. If the first vehicle is compliant with the safe following regulation, the controller sends a signal to the power transmission unit to actuate the power transmitter at S516 to transmit a wireless directional power beam to the first vehicle.

When the first vehicle is compliant with the speed and safe following distance regulations, the first vehicle may receive a higher level of energy or a longer duration beam of energy. The transmission energy of the wireless directional power beam depends on the amount of energy stored in the storage battery, whether the vehicle complies with the speed regulation and whether the vehicle complies with the safe following distance regulation as shown in Table 3.

TABLE 3

Transmission parameters with respect to energy level, speed and safe distance compliance.

| Sufficient Energy? | Speed ≤ Posted Speed | Safe Following Distance? | Transmission Energy | Transmission Duration |
|---|---|---|---|---|
| Yes | Yes | Yes | High | Long |
| Yes | No | Yes | Low | Short |
| Yes | Yes | No | Low | Short |
| Yes | No | No | Zero | Zero |
| Low | Yes | Yes | Low | Short |

The power receiver used in the above method is configured for receiving the directional wireless power beam and charging at least one of a vehicle storage battery and an electronic device within the at least one vehicle.

The method of traffic regulation further comprises a communication unit including a base station. The control system determines at least one traffic event from the at least one first set of tracking and measurement signals and transmits the traffic event to the communication unit. The communication unit is bidirectionally connected through the base station to the traffic management authority. The base station transmits the traffic event to the traffic management authority.

Notifications from the traffic management authority of traffic information in the vicinity of the traffic regulation system are received by the communication unit and transmitted to the control system.

The method proceeds by determining, by the control system, at least one second traffic event based on the at least one traffic event and the notifications. The control system may further use the notifications to modify the posted speed and safe following distance.

The method of traffic regulation proceeds by further comprising tracking and measuring the movement of at least one second one of the plurality of vehicles as shown at S528 of FIG. 5, and generating at least one second set of tracking and measurement signals as shown at S530; receiving, with the control system as at S540, S542, the at least one second set; and analyzing, with the control system, the movement of the plurality of vehicles. The control system may utilize the movement of the plurality of vehicles and may incorporate the notification information in further determining at least one of a posted speed, a safe following distance, a traffic slowdown, a traffic accident, a crime, a terrorism act, a weather warning, a construction zone in the vicinity of the roadway, a fault in the roadway, and an occupancy of a parking lot near the roadway.

A display, located as to be visible when viewed from the plurality of vehicles, displays at least one of a posted speed, safe following distance, a traffic slowdown, a traffic accident, a crime, a terrorism act, a weather warning, a construction zone in the vicinity of the roadway, a fault in the roadway, an occupancy of a parking lot near the roadway.

The control system may use the traffic notification and movement information to provide alerts to the drivers regarding events on the highway, such as "Accident in 50 ft. Stay in left lane", "Amber alert. White van, 2018, tag number XLS354", or "Road closed ahead. All traffic Exit 17".

At S510, the method involves harvesting wind energy generated by at least one wind turbine located at the side of the roadway, wherein wind generated by the movement of at least one of the plurality of vehicles turns the wind turbine, wherein the turning of the wind turbine generates an electric current, the electric current charging a storage battery of the power transmission unit, and/or harvesting compression energy generated by the compression of an array of piezoelectric sensors embedded in the roadway beneath the plurality of moving vehicles, wherein compressing of each piezoelectric sensor by at least one vehicle of the plurality of vehicles driving over the array generates an electric current, the electric current charging a storage battery of the power transmission unit.

Figure 6:
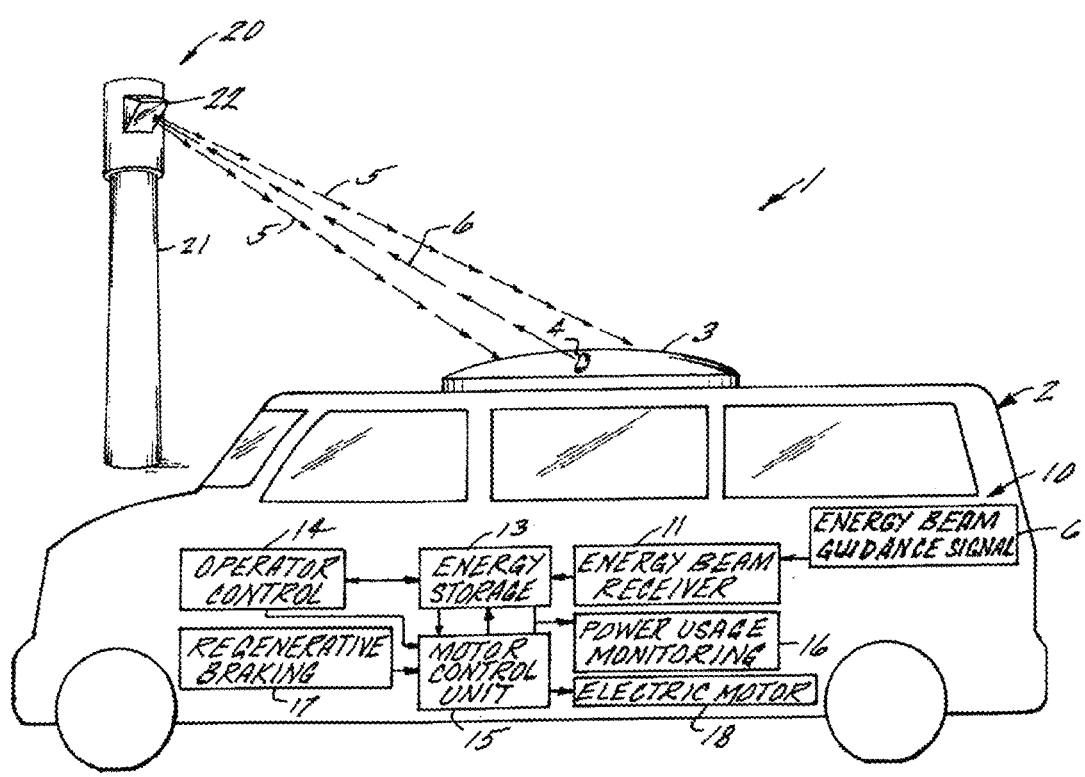
FIG. 6 is an exemplary illustration of a vehicle with a power receiver, according to certain embodiments.

For illustrative purposes, FIG. 6 depicts a non-limiting example of a vehicle having a power receiving antenna 13 as described in U.S. Pat. No. 6,114,834. This example vehicle includes an energy beam receiver 11 and energy storage 13.

The control system of the current disclosure further includes a computing device having hardware and software configured to accomplish the controlling described above.

Figure 7:
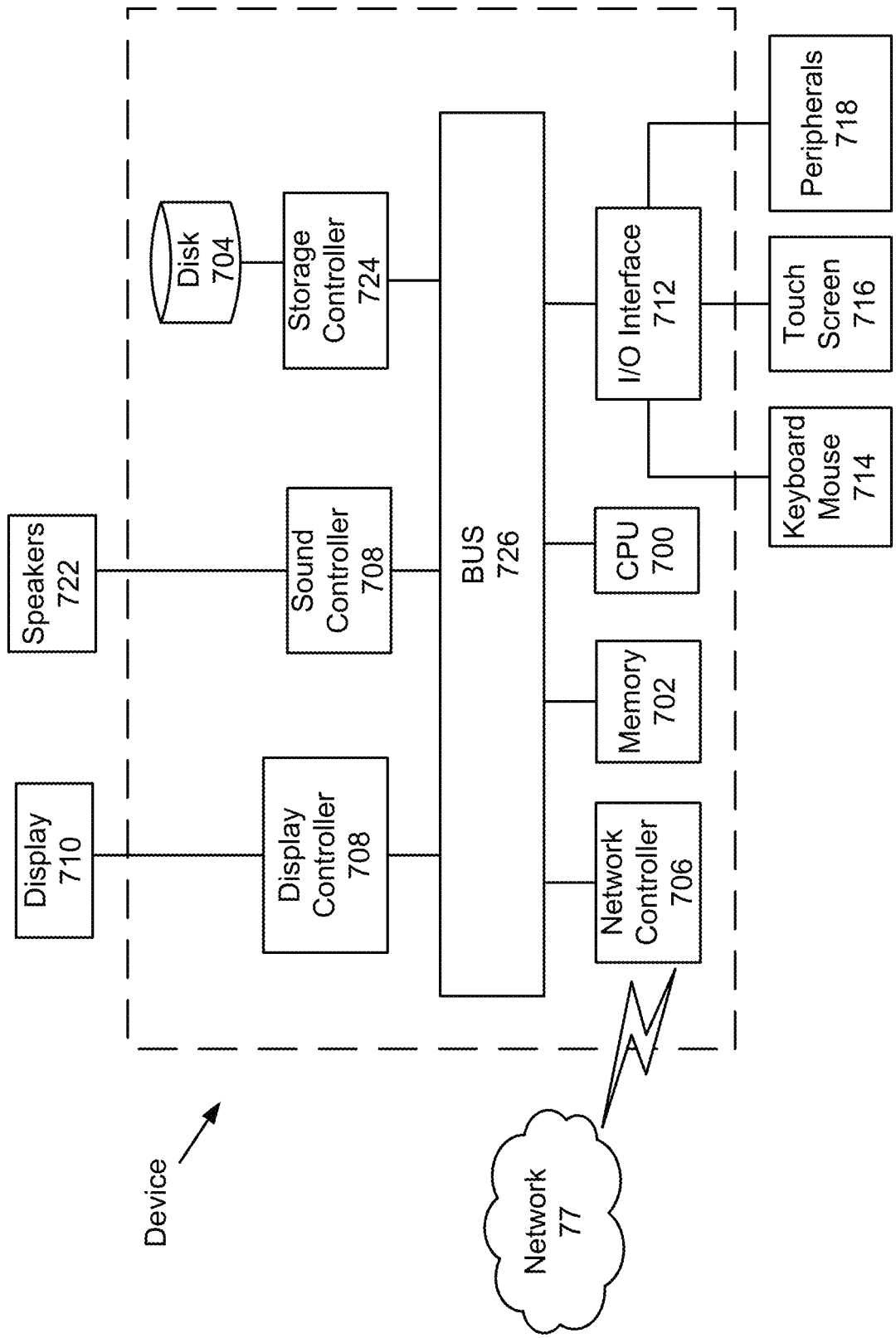
FIG. 7 is an illustration of a non-limiting example of a computing device which may be used in the computing system, according to certain embodiments.

Next, a hardware description of the computing device according to exemplary embodiments is described with reference to FIG. 7. In FIG. 7, the computing device includes a CPU 700 which performs the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN subnetworks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
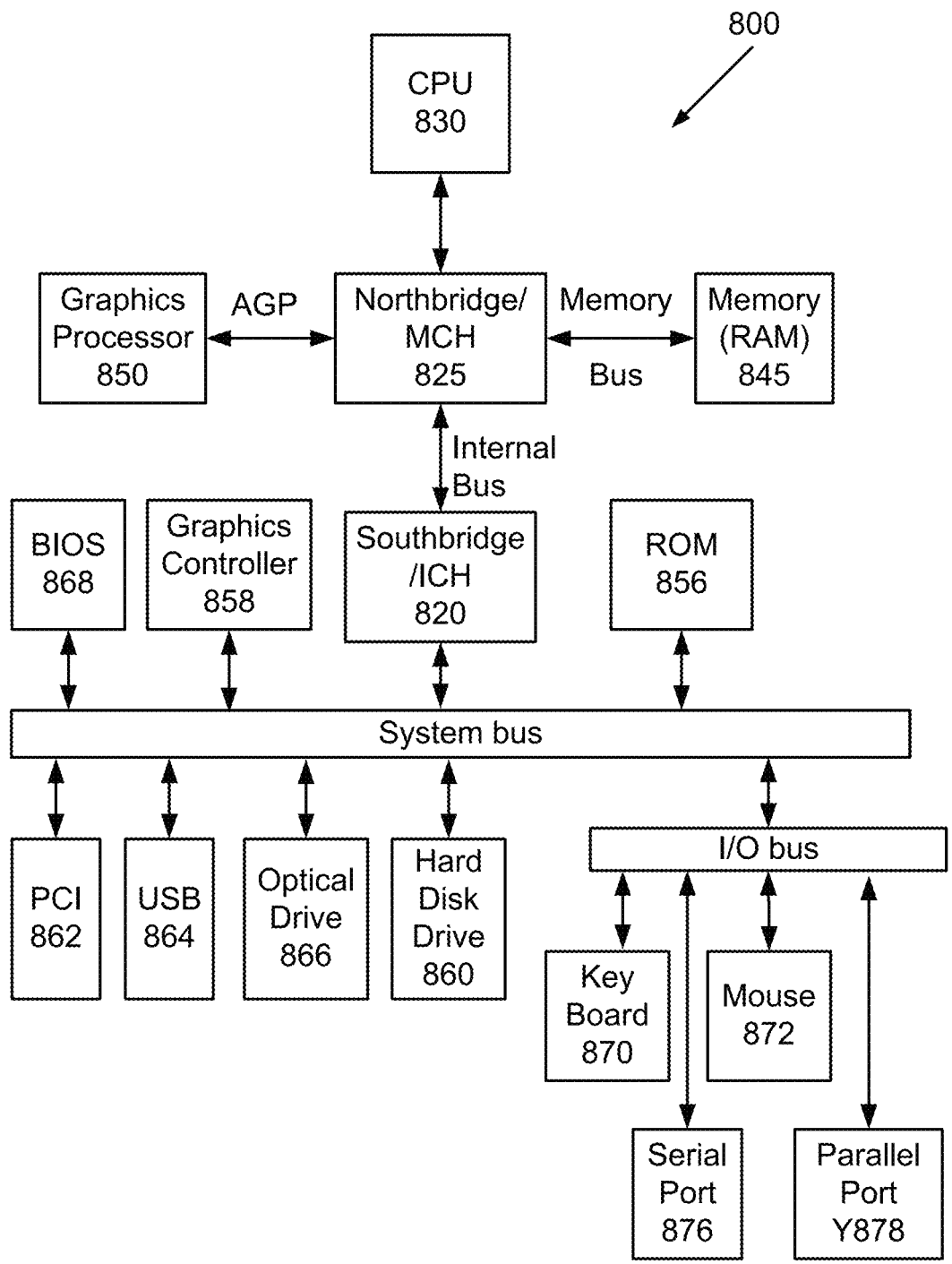
FIG. 8 is an exemplary schematic diagram of a data processing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
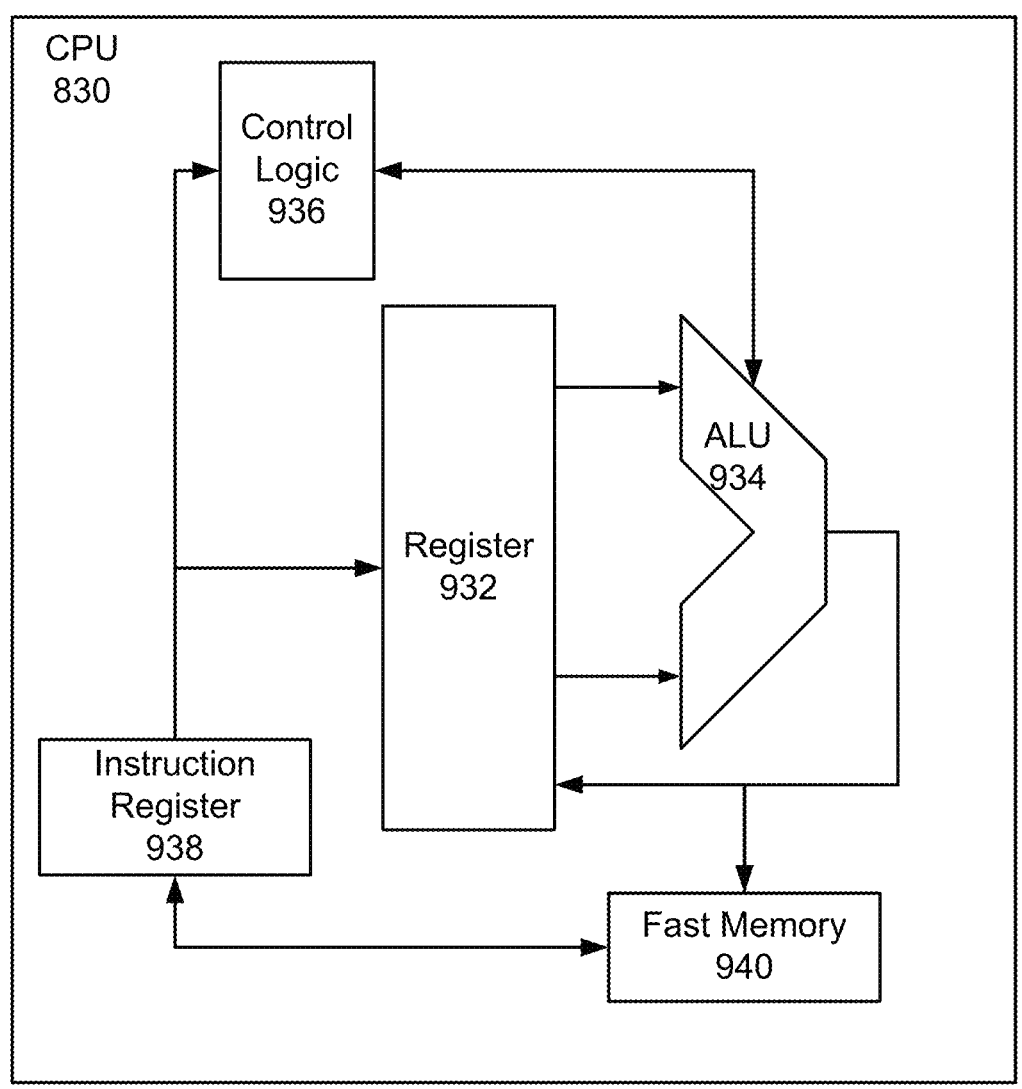
FIG. 9 is an exemplary schematic diagram of a processor, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
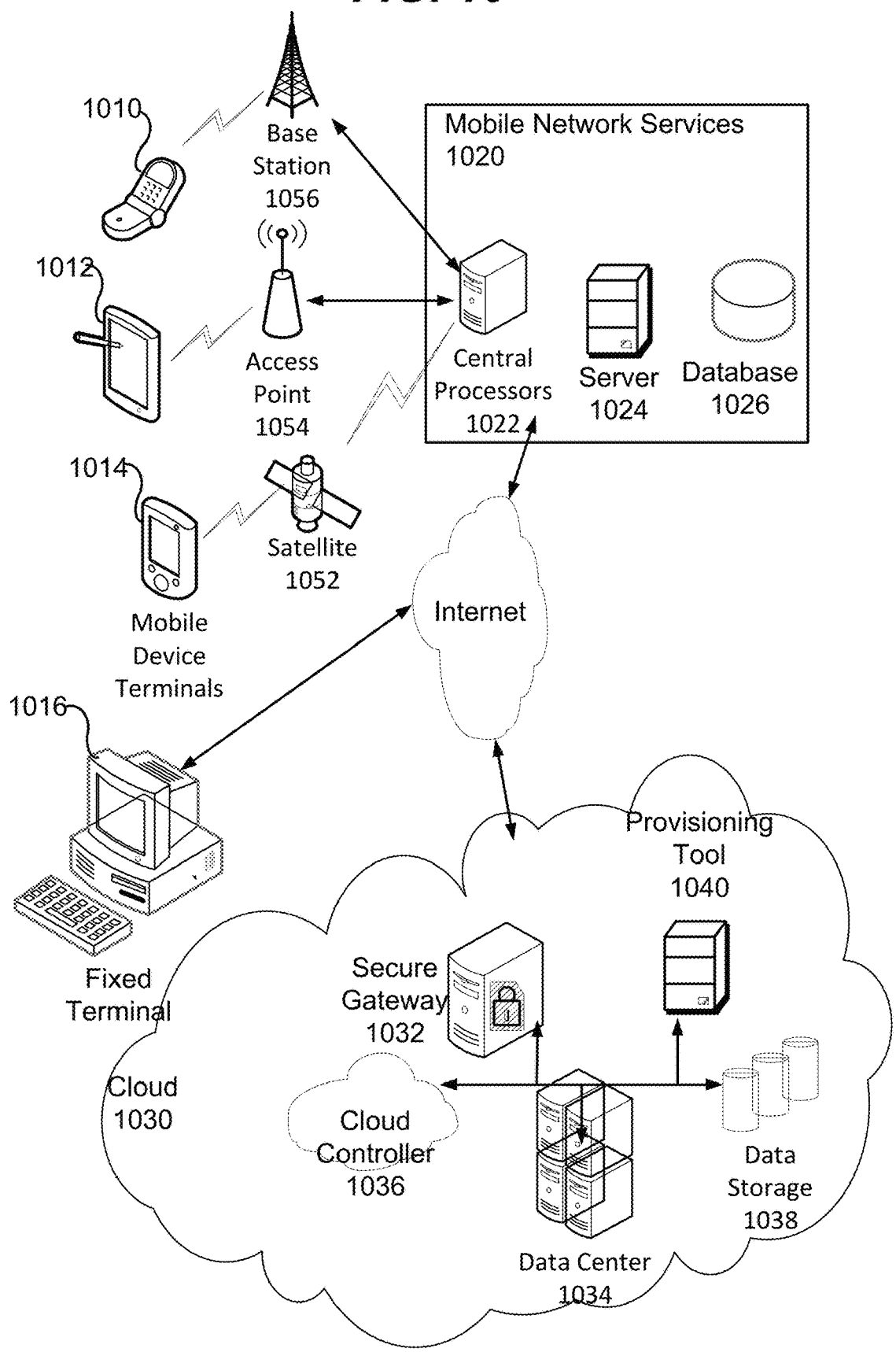
FIG. 10 is an exemplary example of a distributed processing system.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A traffic regulation system, comprising:
at least one energy harvester to harvest energy from the movement of a plurality of vehicles on a roadway;
at least one power transmission unit operatively connected to the energy harvester to receive harvested energy and store the harvested energy in a power transmission unit storage battery, the power transmission unit including a power transmitter configured to transmit a directional wireless power beam using the harvested energy from the storage battery;
at least one detector configured to track and measure the movement of at least one vehicle of the plurality of vehicles;
a control system operatively connected to the at least one detector and the power transmission unit, wherein the control system has circuitry configured to:
determine whether the at least one vehicle is in compliance with at least one traffic regulation based on the measurement of the at least one detector; and
actuate the power transmitter to transmit a directional wireless power beam to the identified vehicle based on the identified vehicle being in compliance with the at least one traffic regulation.

2. The traffic regulation system of claim 1, wherein the traffic regulation is compliance with a posted driving speed.

3. The traffic regulation system of claim 1, wherein the traffic regulation is compliance with a safe following distance between the at least one vehicle and a second vehicle directly in front of the at least one vehicle.

4. The traffic regulation system of claim 1, wherein the at least one detector is at least one of a still camera, a video camera, an array of cameras, an inductive loop, an electromagnet, a magnetic sensor, an acoustic sensor, a laser beam, an infrared beam, a motion detector, a pneumatic tube, a piezoelectric sensor, a Doppler microwave sensor and a radar microwave sensor.

5. The traffic regulation system of claim 1, wherein the power transmission unit is located at the side of the roadway, and the power transmitter transmits the directional wireless power beam to the at least one vehicle from above the vehicle.

6. The traffic regulation system of claim 1, wherein the power transmission unit is embedded in the roadway beneath the plurality of moving vehicles, and the power transmitter transmits the directional wireless power beam to the at least one vehicle from beneath the at least one vehicle.

7. The traffic regulation system of claim 1, wherein the power transmitter is at least one of a radio frequency antenna, a microwave antenna, an inductive coil, a millimeter wave antenna, and a laser.

8. The traffic regulation system of claim 1, wherein the energy harvester comprises an array of piezoelectric sensors embedded in the roadway beneath the plurality of moving vehicles, wherein each piezoelectric sensor generates an electric current when compressed by at least one vehicle of the plurality of vehicles driving over the array, and wherein the electric current charges a storage battery of the power transmission unit.

9. The traffic regulation system of claim 1, wherein energy harvester is at least one wind turbine located at the side of the roadway, wherein wind generated by the movement of at least one of the plurality of vehicles turns the wind turbine, wherein the turning of the wind turbine generates an electric current, and wherein the electric current charges a storage battery of the power transmission unit.

10. The traffic regulation system of claim 1,
wherein the control system further has circuitry configured to determine whether the at least one vehicle is equipped with a power receiver configured to receive the directional wireless power beam,
wherein the power receiver is located on at least one of a roof of the at least one vehicle and an undercarriage of the at least one vehicle; and
wherein the power receiver charges at least one of a vehicle storage battery and an electronic device inside the at least one vehicle upon receiving the directional wireless power beam.

11. The traffic regulation system of claim 1, further comprising a communication unit including a base station;
wherein the control system is operatively connected to the communication unit;
wherein the control system is further configured to determine at least one traffic event from the measurement;
wherein the control system causes the at least one traffic event to be transmitted to a traffic management authority by the base station of the communication unit; and
wherein the communication unit receives notifications from the traffic management authority of traffic information in the vicinity of the traffic regulation system;
wherein the control system is further configured to determine at least one further traffic event based on the at least one traffic event and the notifications.

12. The traffic regulation system of claim 11, wherein the at least one further traffic event is at least one of a traffic slowdown, a traffic accident, a crime, a terrorism act, a weather warning, a traffic accident, a construction zone, a fault in the roadway, and an occupancy of a parking lot near the roadway.

13. The traffic regulation system of claim 12, further comprising a support structure for housing the control system, communication unit, base station, power transmission unit, power transmission unit storage battery and power transmitter,
wherein the support structure is located at the side of the roadway.

14. The traffic regulation system of claim 13, wherein the support structure further includes a display operatively connected to the control system, wherein the display is located at the top of the support structure and configured as to be visible when viewed from the plurality of vehicles, and
wherein the control system actuates the display to notify drivers of the plurality of vehicles of at least one of a posted speed, a safe following distance, a seatbelt monitoring zone, a traffic slowdown, a traffic accident, a crime, a terrorism act, a weather warning, a construction zone, a fault in the roadway and an occupancy of a parking lot near the roadway.

15. A method of traffic regulation, comprising:
harvesting energy, with at least one energy harvester, from the movement of a plurality of moving vehicles on a roadway;
receiving the harvested energy at a power transmission unit configured for storing the harvested energy in a power transmission unit storage battery, the power transmission unit further comprising a power transmitter for transmitting a directional wireless power beam using the harvested energy stored in the storage battery;
tracking and measuring, with a detector, the movement of at least one vehicle of the plurality of vehicles;
generating, by the detector, at least one first set of tracking and measurement signals;
receiving, by a control system operatively connected to the detector and the power transmission unit, the at least one first set of tracking and measurement signals, the control system having circuitry configured for analysis of the tracking and measurement signals;
determining, with the control system, whether the at least one vehicle is in compliance with at least one traffic regulation based on the signals;
actuating, by the control system, the power transmitter to transmit a directional wireless power beam to the at least one vehicle based on the at least one vehicle being in compliance with the at least one traffic regulation.

16. The method of traffic regulation of claim 15, wherein being in compliance with the traffic regulation includes at least one of complying with a posted driving speed and complying with a safe following distance between the at least one vehicle and a second vehicle directly in front of the at least one vehicle.

17. The method of traffic regulation of claim 15, further comprising determining whether the vehicle is equipped with a power receiver, the power receiver configured for receiving the directional wireless power beam and charging at least one of a vehicle storage battery and an electronic device within the at least one vehicle.

18. The method of traffic regulation of claim 15, further comprising a communication unit including a base station;
determining, with the control system, at least one traffic event from the at least one first set of tracking and measurement signals; and
transmitting the traffic event to a traffic management authority by the base station of the communication unit;
receiving, by the communication unit, notifications from the traffic management authority of traffic information in the vicinity of the traffic regulation system;
determining, by the control system, at least one second traffic event based on the at least one traffic event and the notifications.

19. The method of traffic regulation of claim 18, further comprising
tracking and measuring the movement of at least one second one of the plurality of vehicles, and generating at least one second set of tracking and measurement signals;
receiving, with the control system, the at least one second set;
analyzing, with the control system, the movement of the plurality of vehicles and further determining at least one of a posted speed, a safe following distance, a traffic slowdown, a traffic accident, a crime, a terrorism act, a weather warning, a construction zone in the vicinity of the roadway, a fault in the roadway, and an occupancy of a parking lot near the roadway;
displaying, by a display located as to be visible when viewed from the plurality of vehicles, at least one of a posted speed, safe following distance, a traffic slowdown, a traffic accident, a crime, a terrorism act, a weather warning, a construction zone in the vicinity of the roadway, a fault in the roadway, an occupancy of a parking lot near the roadway.

20. The method of traffic regulation of claim 18, further comprising harvesting energy by at least one of:
harvesting wind energy generated by at least one wind turbine located at the side of the roadway, wherein wind generated by the movement of at least one of the plurality of vehicles turns the wind turbine, wherein the turning of the wind turbine generates an electric current, the electric current charging a storage battery of the power transmission unit, and
harvesting compression energy generated by the compression of an array of piezoelectric sensors embedded in the roadway beneath the plurality of moving vehicles, wherein compressing of each piezoelectric sensor by at least one vehicle of the plurality of vehicles driving over the array generates an electric current, the electric current charging a storage battery of the power transmission unit.

* * * * *